US010434869B2

(12) United States Patent
MacDonald et al.

(10) Patent No.: US 10,434,869 B2
(45) Date of Patent: Oct. 8, 2019

(54) METHODS AND SYSTEMS FOR A LATCH PLATE ASSEMBLY IN A MOTOR VEHICLE

(71) Applicant: Ford Global Technologies, LLC, Dearborn, MI (US)

(72) Inventors: Benjamin MacDonald, Romford (GB); Christopher Leck, Enfield (GB); Thomas Pates, Manningtree (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/997,995

(22) Filed: Jun. 5, 2018

(65) Prior Publication Data
US 2019/0039453 A1  Feb. 7, 2019

(30) Foreign Application Priority Data

Aug. 3, 2017 (GB) .................................. 1712499.1

(51) Int. Cl.
*B60K 13/04* (2006.01)
*F01N 13/08* (2010.01)
*F01N 13/18* (2010.01)

(52) U.S. Cl.
CPC .............. *B60K 13/04* (2013.01); *F01N 13/08* (2013.01); *F01N 13/1822* (2013.01)

(58) Field of Classification Search
CPC ...... B60K 13/04; F01N 13/08; F01N 13/1822
See application file for complete search history.

(56) References Cited

U.S. PATENT DOCUMENTS

| 1,231,928 A | 7/1917 | Miller et al. |
| 5,234,185 A | 8/1993 | Hoffman et al. |
| 5,507,463 A * | 4/1996 | Kobylinski ............ B60K 13/04 248/610 |
| 5,836,212 A | 11/1998 | Bates |

(Continued)

FOREIGN PATENT DOCUMENTS

| CN | 102162671 A | 8/2011 |
| DE | 102008031611 A1 | 1/2009 |
| JP | H08296778 A | 11/1996 |

OTHER PUBLICATIONS

Intellectual Property Office of the United Kingdom, Combined Search and Examination Report Issued in Application No. GB1712499.1, dated Jan. 17, 2018, South Wales, 7 pages.

*Primary Examiner* — Brian L Swenson
(74) *Attorney, Agent, or Firm* — Geoffrey Brumbaugh; McCoy Russell LLP

(57) ABSTRACT

Methods and systems are provided for a latch plate assembly for coupling pipes to a housing of an engine component. In one example, the latch plate assembly comprises: a first latch plate couplable to a first pipe; and a second latch plate couplable to a second pipe, the first and second latch plates being couplable to the housing, wherein the first and second latch plates are together configured to define a bore at an interface between the first and second latch plates. The bore receives a fastener to couple the first and second latch plates to the housing and wherein the bore has a perimeter, the first latch plate defines a first portion of the bore perimeter and the second latch plate defines a second portion of the bore perimeter, the first and second portion together defining the bore perimeter.

19 Claims, 8 Drawing Sheets

(56) References Cited

U.S. PATENT DOCUMENTS

| | | | |
|---|---|---|---|
| 6,402,119 B1* | 6/2002 | Miska | B60K 13/04 |
| | | | 248/58 |
| 2004/0080155 A1 | 4/2004 | Hayes et al. | |
| 2005/0194728 A1* | 9/2005 | Molet | F01N 13/1822 |
| | | | 267/151 |
| 2006/0006642 A1 | 1/2006 | Getto et al. | |
| 2010/0083644 A1* | 4/2010 | Biedler | F01N 3/28 |
| | | | 60/299 |
| 2010/0126158 A1* | 5/2010 | Murakami | F01N 13/08 |
| | | | 60/323 |
| 2014/0265307 A1 | 9/2014 | Dorland et al. | |
| 2015/0337713 A1* | 11/2015 | Callahan | F01N 13/08 |
| | | | 181/228 |
| 2017/0008370 A1 | 1/2017 | Hiraoka | |
| 2017/0037767 A1* | 2/2017 | Wagner | B23K 31/02 |

* cited by examiner

METHODS AND SYSTEMS FOR A LATCH PLATE ASSEMBLY IN A MOTOR VEHICLE

CROSS REFERENCE TO RELATED APPLICATION

This application claims priority to Great Britain Patent Application No. 1712499.1, filed Aug. 3, 2017. The entire contents of the above-referenced application are hereby incorporated by reference in their entirety for all purposes.

FIELD

The present description relates generally to system and methods for a latch plate assembly for coupling pipes to a motor vehicle housing for improving the ease of assembling the latch plate assembly with the housing.

BACKGROUND/SUMMARY

One or more pipes may be coupled to engine components to carry fluids to and from the engine components. As an example, engine coolant may enter an exhaust turbine via a first pipe and exit the turbine via a second pipe. Each of the first pipe and the second pipe may be coupled to a housing of the engine component via latch plates. Latch plates coupled to each of the pipes may be attached to the housing via a fastener.

However, the inventors herein have recognized potential issues with such systems. As one example, when two latch plates, each coupled to a separate pipe, are attached to the housing via a fastener, the two latch plates may overlap to enable a single fastener to attach each of the latch plates to the housing. Due to the overlapping of the latch plates, relative to the housing, one of the two pipes may be placed higher than the other pipe. Therefore, the geometry of the pipes and the positioning of seals used to hold the pipes in place within the housing may have to be adjusted to account for the difference in placement of the two pipes. Further, during assembly of the pipes to the housing, the latch plates may be placed in a wrong order (such as a first latch plate which is designed to be at the top may be placed below a second latch plate designed to be at the bottom). Attaching the larch plates in the erroneous order may adversely affect the integrity of the coupling due to the geometry of the pipes and the seals being customized for a single attachment configuration. As an example, the seals may not be able to inhibit leakage of fluid in the pipes. Also, misalignment of the pipes with the engine component may cause stress in the assembly, thereby affecting durability of the component.

In one example, the issues described above may be at least partly addressed by a latch plate assembly for coupling pipes to a housing, the latch plate assembly comprising: a first latch plate couplable to a first pipe; and a second latch plate couplable to a second pipe, the first and second latch plates being couplable to the housing, wherein the first and second latch plates are together configured to define a bore at an interface between the first and second latch plates, wherein the bore receives a fastener to couple the first and second latch plates to the housing and wherein the bore has a perimeter, the first latch plate defining a first portion of the bore perimeter and the second latch plate defining a second portion of the bore perimeter, the first portion and the second portion together defining the bore perimeter, wherein the first and second latch plates each comprise a plurality of teeth, wherein the plurality of teeth of one of the latch plates are configured to interface in an interdigitated manner with the plurality of teeth of the other of the latch plates. In this way, two symmetric co-planer latch plates may be used to effectively attach two pipes to an engine component.

As one example, a first latch plate may be coupled (such as welded) to a first pipe and a second latch plate may be coupled (such as welded) to a second pipe. A set of teeth may be formed on one side of each of the two latch plates. In the first latch, the teethed side may define one half of a perimeter of a bore while in the second latch, the teethed side may define the other half of a perimeter of the bore. The adjacent sides of the first latch plate and the second latch plates with the teeth may be interlocked forming a planer surface. Upon interlocking the two latch plates, a bore may be defined at a centre of the planer surface. A fastener may be inserted in the bore to affix the latch plates, each coupled to a pipe, to a housing of an engine component. Pipe connectors may be attached to the ends of the pipes in contact with the respective latch plates. The pipe connectors may be inserted in respective housing ports formed within the housing of the engine component and the pipe connectors may be secured within the housing ports via sealing agents such as O-rings.

According to an aspect of the present disclosure, there is provided a latch plate assembly for coupling pipes to a housing, e.g. for a motor vehicle. The latch plate assembly comprises: a first latch plate couplable to a first pipe; and a second latch plate couplable to a second pipe, the first and second latch plates being couplable to the housing, wherein the first and second latch plates are together configured to define a bore at an interface between the first and second latch plates. The bore may receive a fastener to couple the first and second latch plates to the housing and wherein the bore may have a perimeter, e.g. extending about a longitudinal axis of the bore. The first latch plate may define a first portion of the bore perimeter and the second latch plate may define a second portion of the bore perimeter, the first and second portions together defining the bore perimeter. The first and second latch plates may each comprise a plurality of teeth, wherein the teeth of one of the latch plates are configured to interface in an interdigitated manner with the teeth of the other latch plate.

The first and second latch plates may be provided adjacent to each other, e.g. in a side-by-side relationship. The first and second latch plates may not overlap, e.g. in a direction away from the housing, at the location of the fastener bore. The interface may define a plane that cuts through the bore with a longitudinal axis of the bore lying in the cutting plane. In other words, the interface may be in a plane aligned with the longitudinal axis of the bore.

Each of the first and second latch plates may define half of the fastener bore, e.g. a semi-circular portion of the fastener bore perimeter. Alternatively, the first and second latch plates may define different portions of the fastener bore perimeter.

The first and second latch plates may be together configured to define a fastener surface, e.g. about the bore, against which a shoulder of the fastener abuts in order to couple the first and second latch plates to the housing. For example, the fastener shoulder may clamp the first and second latch plates against the housing at the fastener surface. The fastener surface may be defined on an upper surface of the first latch plate and an upper surface of the second latch plate.

The first and second latch plates may be configured such that when the first and second latch plates are coupled to the housing by the fastener, the first and second pipes may be arranged in fluidic communication with first and second ports provided on the housing respectively.

The first and second latch plates may be common components. In other words, the exterior dimensions, e.g. the size, shape and thickness of the first and second latch plates may be the same. Alternatively, one or more of the size, shape and thickness may vary. In some arrangements, bores or other features provided in the first and second latch plates in order to couple to the first and second pipes may have different sizes between the first and second latch plates.

The first and second latch plates may each comprise an interface portion configured to interlock with the interface portion provided on the other of the first and second latch plates, the interface portions of the first and second latch plates forming the interface. The first and second latch plates may be substantially planar. The latch plates may interlock in a plane common to both the first and second latch plates.

The teeth may be straight, e.g. square or rectangular, trapezium shaped, e.g. having a straight edge and a sloped/angled edge or may be saw tooth, e.g. triangular, shaped. The latch plate assembly may further comprise the first and second pipes. The first pipe may comprise a first pipe connector arranged between the first latch plate and an end of the first pipe when the first pipe is coupled to the first latch plate. The second pipe may comprise a second pipe connector arranged between the second latch plate and an end of the second pipe when the second pipe is coupled to the second latch plate. In other words, the pipe connectors may extend from the respective latch plates towards the housing. The pipe connectors may be coupled to the pipes. Alternatively, the pipe connectors may be formed integrally with the pipes.

The pipe connectors may be received within corresponding ports of the housing when the latch plates are coupled to the housing. Alternatively, the pipe connectors may be arranged about the ports of the housing when the latch plates are coupled to the housing. The pipe connector may at least partially receive the housing ports.

The first and second pipe connectors may be the same length. Alternatively, the first and second pipe connectors may be different lengths. The ports of the housing may comprise connecting portions having different lengths in order to accommodate the length of a corresponding pipe connector, e.g. of the pipe that is in fluid communication with the port.

The first and second pipe connectors may each comprise a seal component, such as an O-ring seal, configured to create a seal between the housing and the first and second pipe connectors respectively. The seal component may be configured to engage the corresponding housing port.

The seal components may be spaced apart from the latch plates, e.g. along the pipe connectors, by respective predetermined distances when the pipes are coupled to the latch plates. The seal components may be spaced apart from the first and second latch plates by the same distance. Alternatively, the seal components may be spaced apart from the first and second latch plates by different respective distances. The housing ports may comprise sealing surfaces configured to engage the seal components of the respective pipe connectors.

In some arrangements, the first and second pipe connectors may be configured in the same way, e.g. the size and shape of the first and second pipe connectors, and the positions of the seal components along the pipe connectors may be the same. Hence, the configuration of the housing ports may also be the same as one another. In other arrangements, the size and/or shape of the first and second pipe connectors, and/or the positions of the seal components along the pipe ends may differ between the first and second pipe, e.g. such that the first pipe end cannot be received within the housing port configured to receive the second pipe end and/or vice versa.

A housing assembly for a motor vehicle, e.g. for a radiator, heating, ventilation and air conditioning unit or any other fluid circuit of the motor vehicle, may comprise the above-mentioned latch plate assembly.

According to another aspect of the present disclosure, there is provided a method for a latch plate assembly of a motor vehicle, wherein the method comprises: coupling a first pipe to a first latch plate; coupling a second pipe to a second latch plate; arranging the first and second latch plates, such that a bore for receiving a fastener is defined at an interface between the first and second latch plates, wherein the bore has a perimeter, the first latch plate defines a first portion of the bore perimeter and the second latch plate defines a second portion of the bore perimeter, the first and second portions together defining the bore perimeter, wherein the first and second latch plates each comprise a plurality of teeth, wherein the teeth of one of the latch plates are configured to interface in an interdigitated manner with the teeth of the other of the latch plates; and coupling the first and second latch plates to a housing using a fastener provided within the bore.

The first and second latch plates may not overlap at the location of the fastener bore. The latch plates may be arranged such that interface portions of the first and second latch plates interlock at the interface.

The method may further comprise arranging the first and second pipes in fluid communication with first and second ports defined by the housing respectively. The method may further comprise sealing between the first and second pipe and the corresponding housing ports, e.g. by arranging sealing components on connectors of the first and second pipe such that the sealing components engages with the corresponding housing ports.

In this way, by using toothed latch plates to couple pipes to an engine component, the latch plates may be positioned with a coplanar interface and the pipes may be coupled at an equal distance relative to the engine component. Due to the equal distance of the pipes relative to the engine component, modifications to pipe geometry and/or the sealing component may no longer be needed, thereby providing cost benefits. The technical effect of using symmetric, toothed, latch plates for a co-planer coupling is that the possibility of erroneous assembly caused by attaching the latch plates in reverse order may no longer be feasible. In this way, the design of the assembly may ensure reduction in errors caused during assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
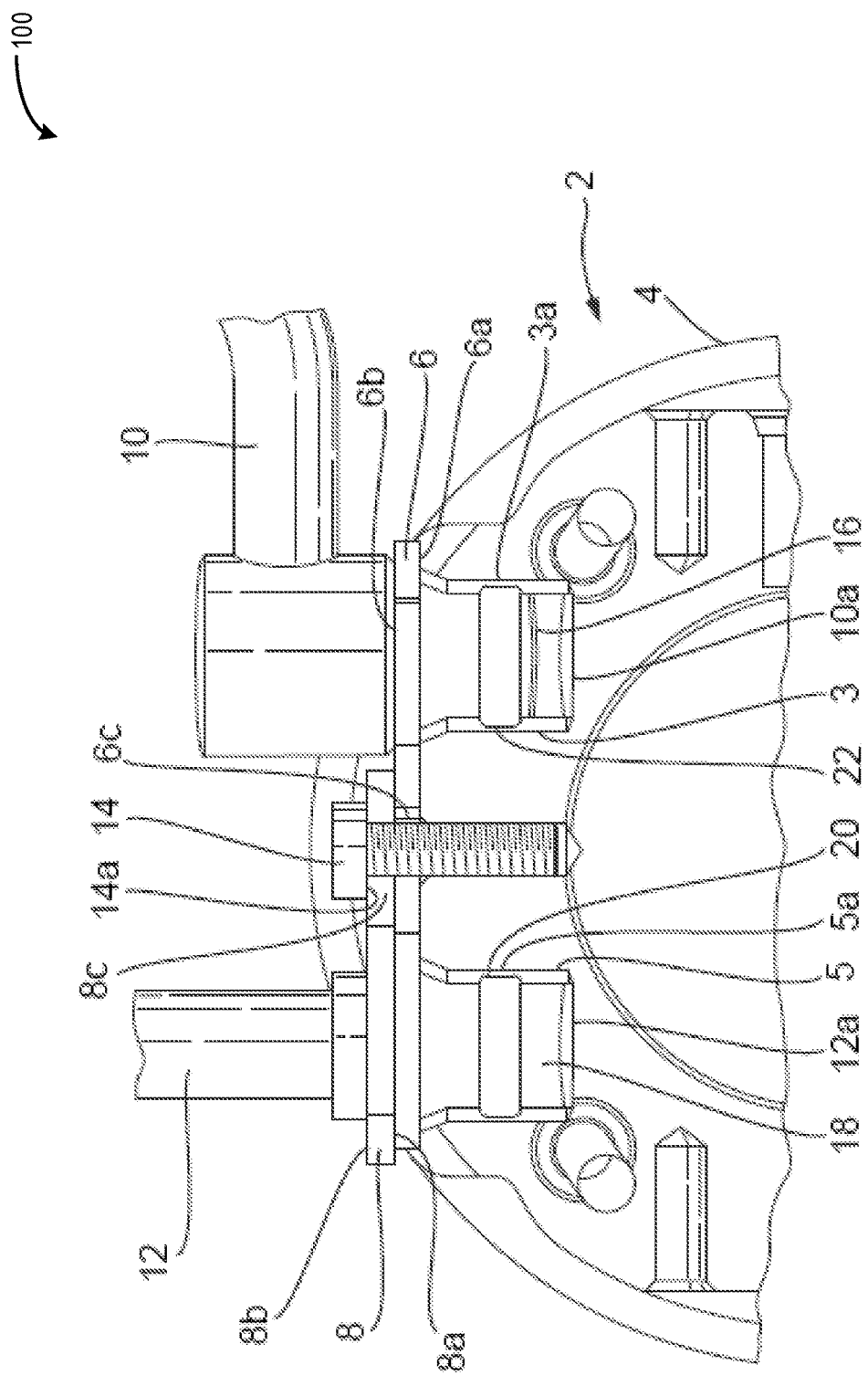
FIG. 1 is a schematic sectional view of a latch plate assembly for a motor vehicle in a correctly assembled condition, as seen in prior art.
Figure 2:
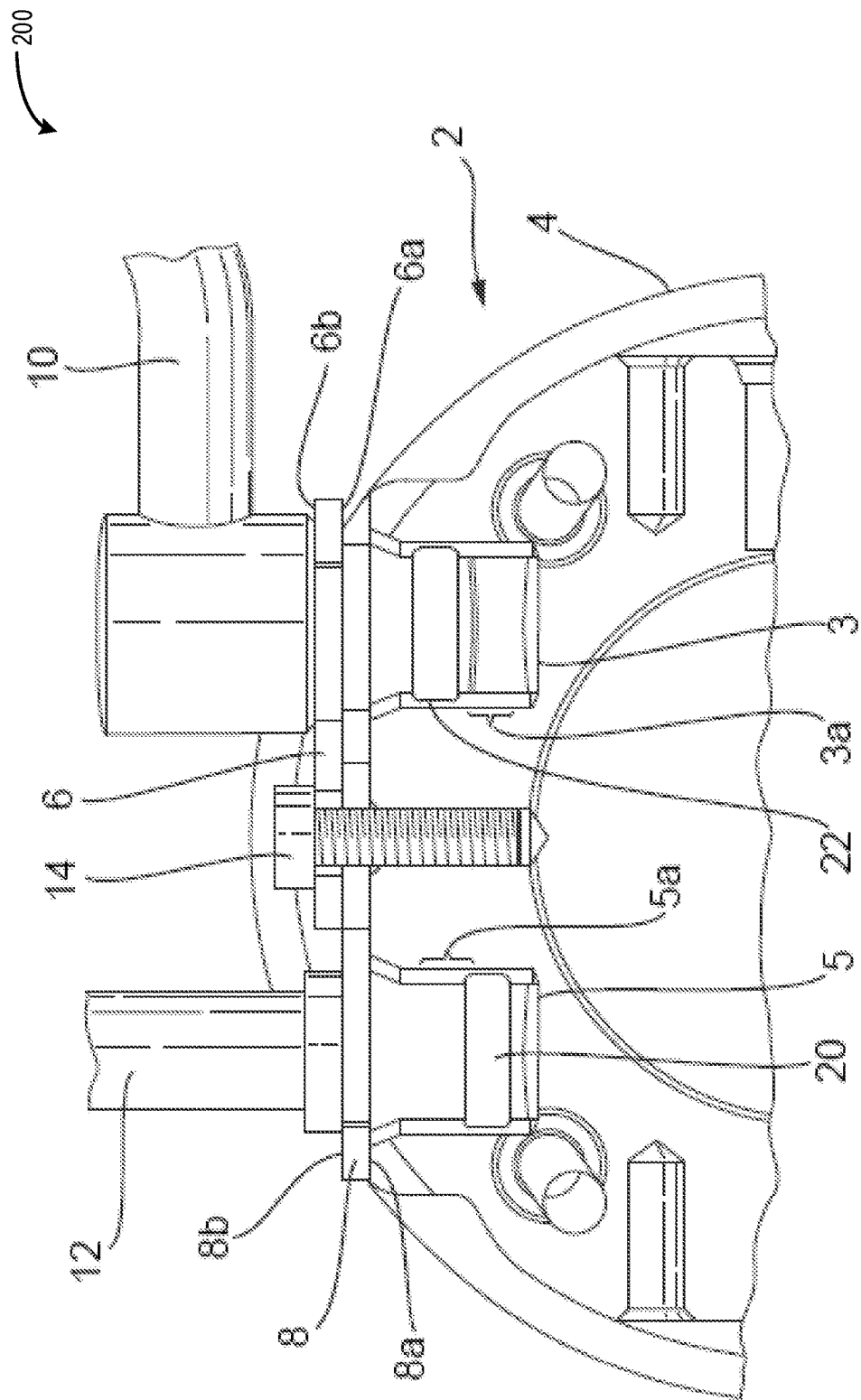
FIG. 2 is a schematic sectional view of a latch plate assembly for a motor vehicle in an incorrectly assembled condition, as seen in prior art.
Figure 3:
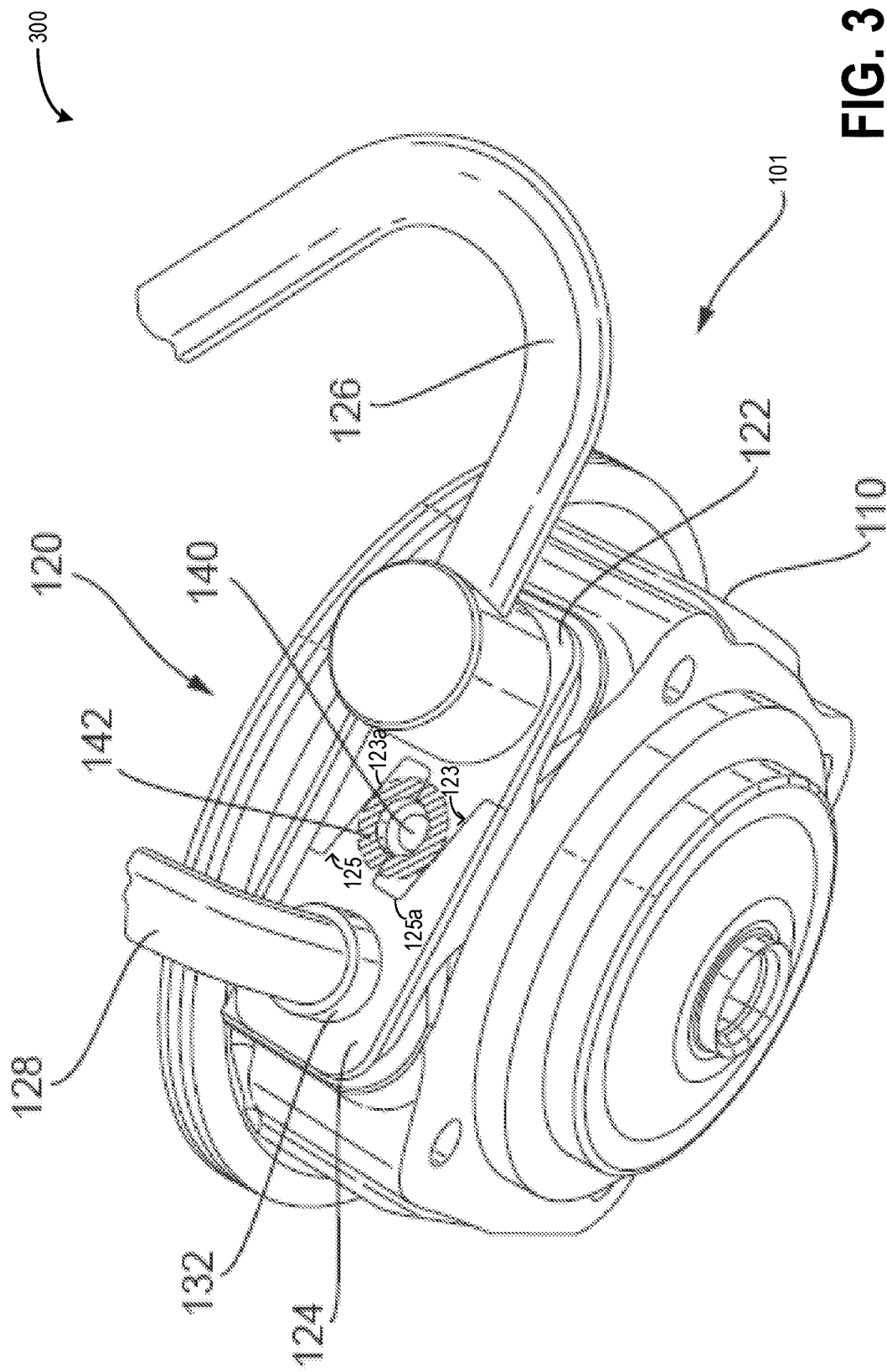
FIG. 3 is a perspective view showing a latch plate assembly for a motor vehicle according to arrangements of the present disclosure.
Figure 4:
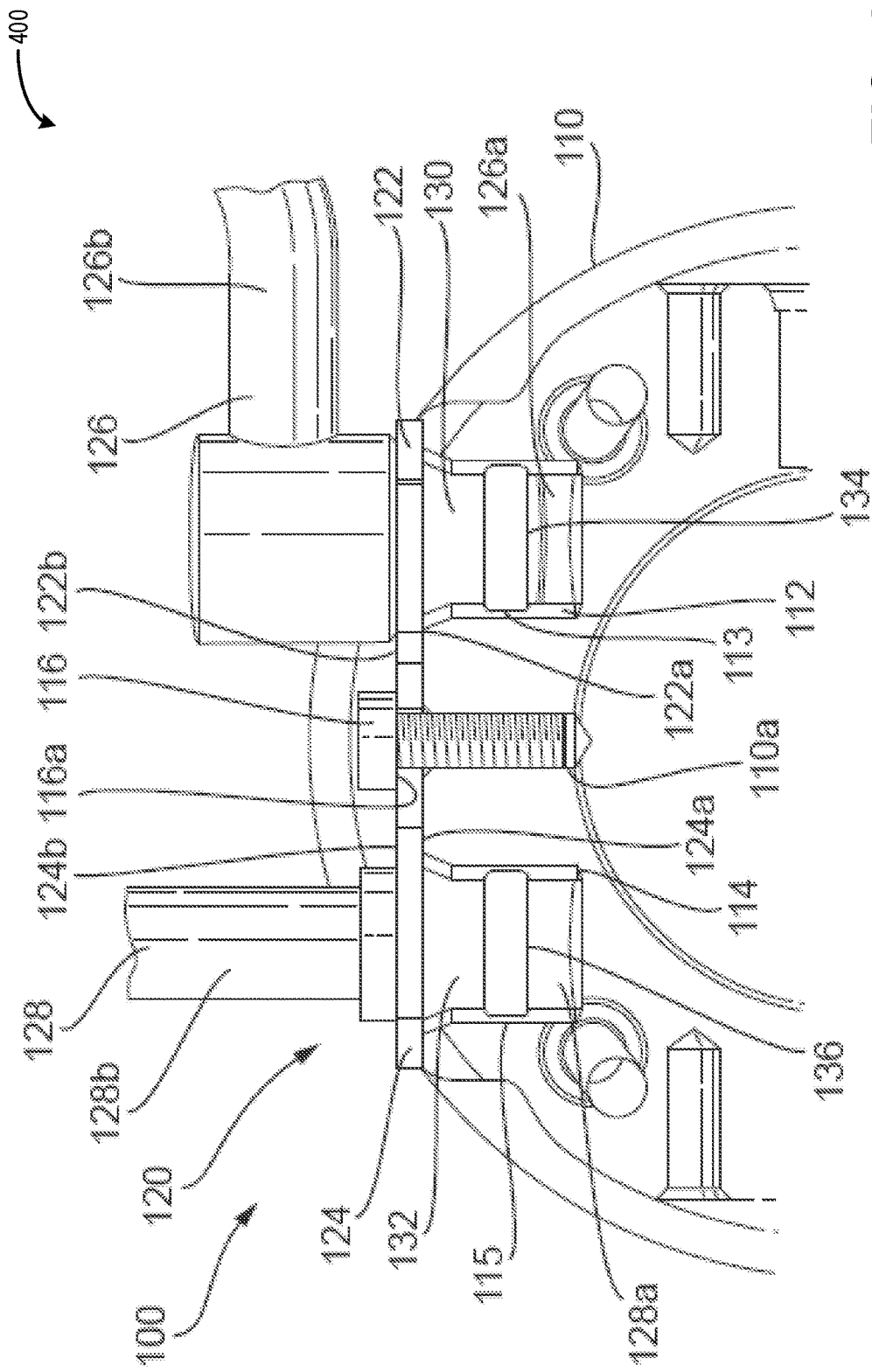
FIG. 4 is a schematic sectional view of a latch plate assembly for a motor vehicle according to arrangements of the present disclosure.
Figure 5:
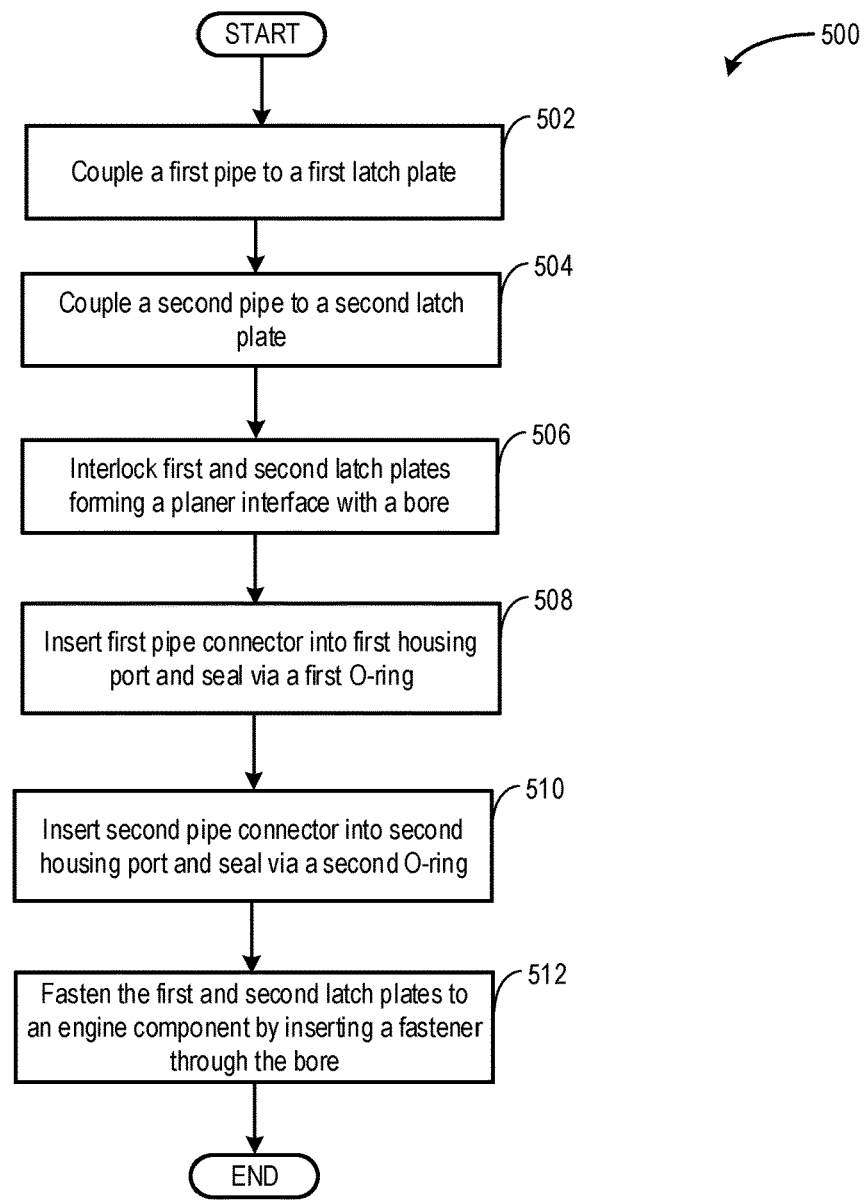
FIG. 5 shows a block diagram depicting a method for a latch plate assembly according to arrangements of the present disclosure.
Figure 6:
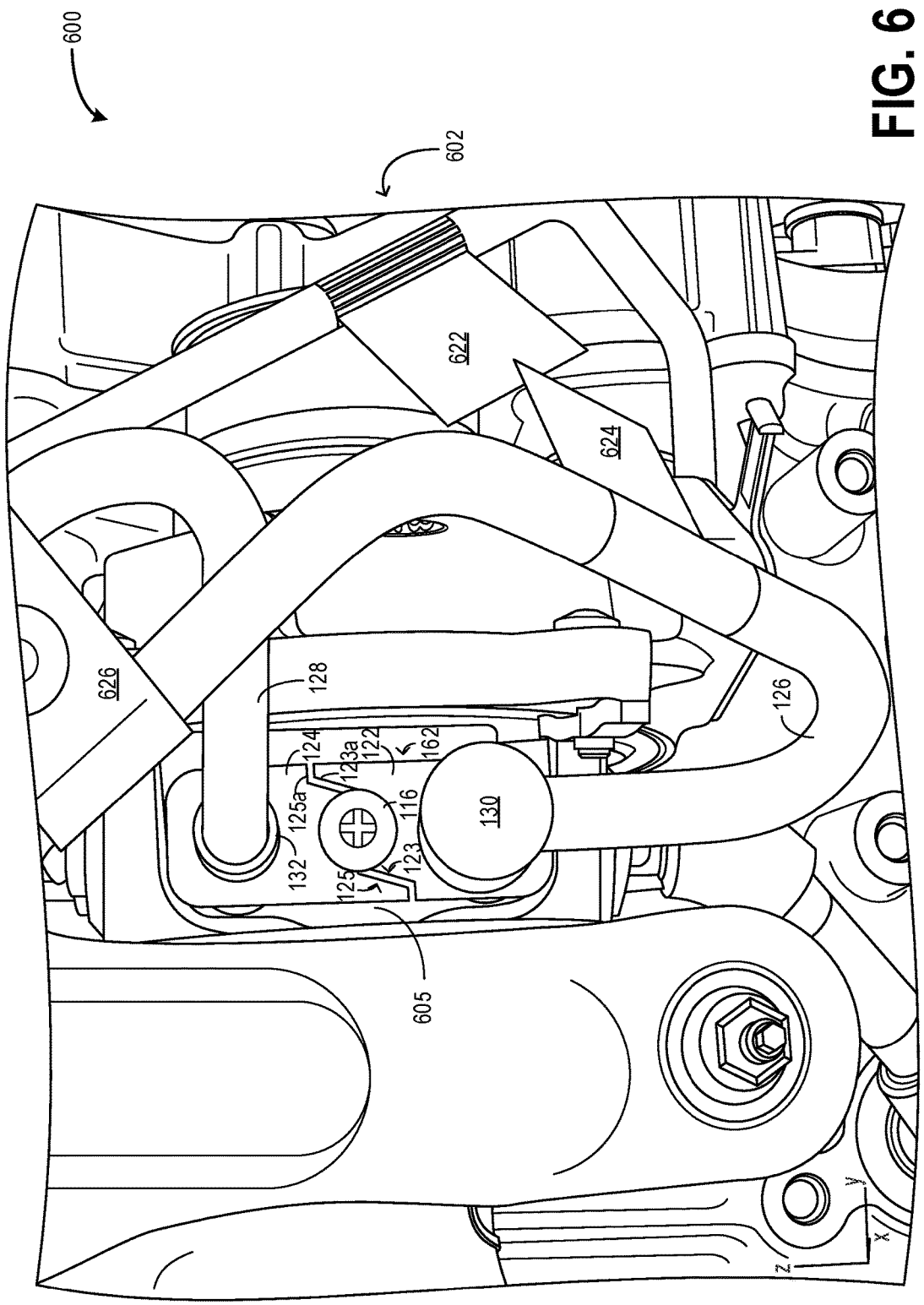
FIG. 6 is a schematic perspective view showing a latch plate assembly coupling a pair of pipes to a turbocharger assembly.
Figure 7:
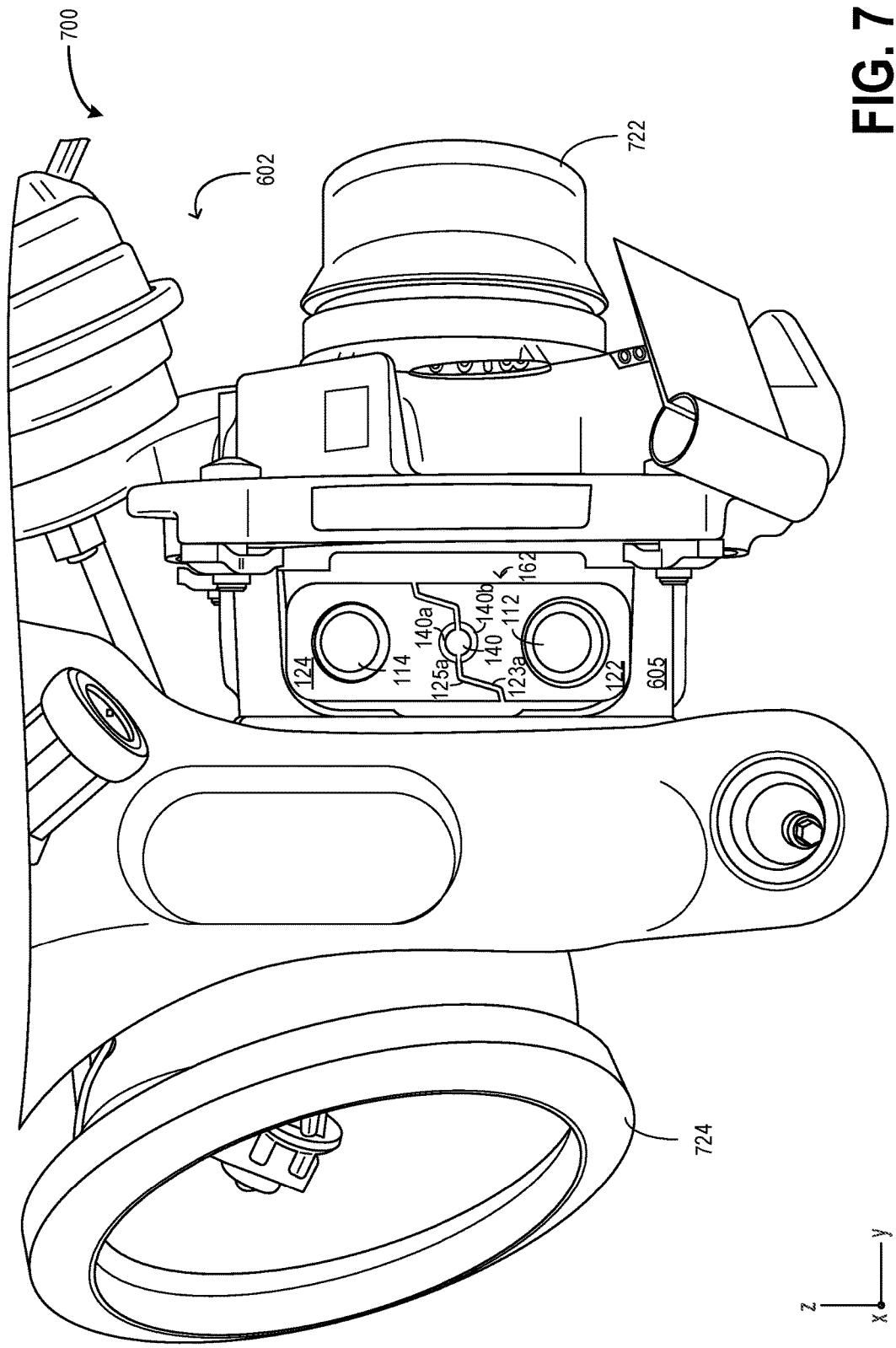
FIG. 7 is a schematic perspective view showing a latch plate assembly on a turbocharger housing.
Figure 8:
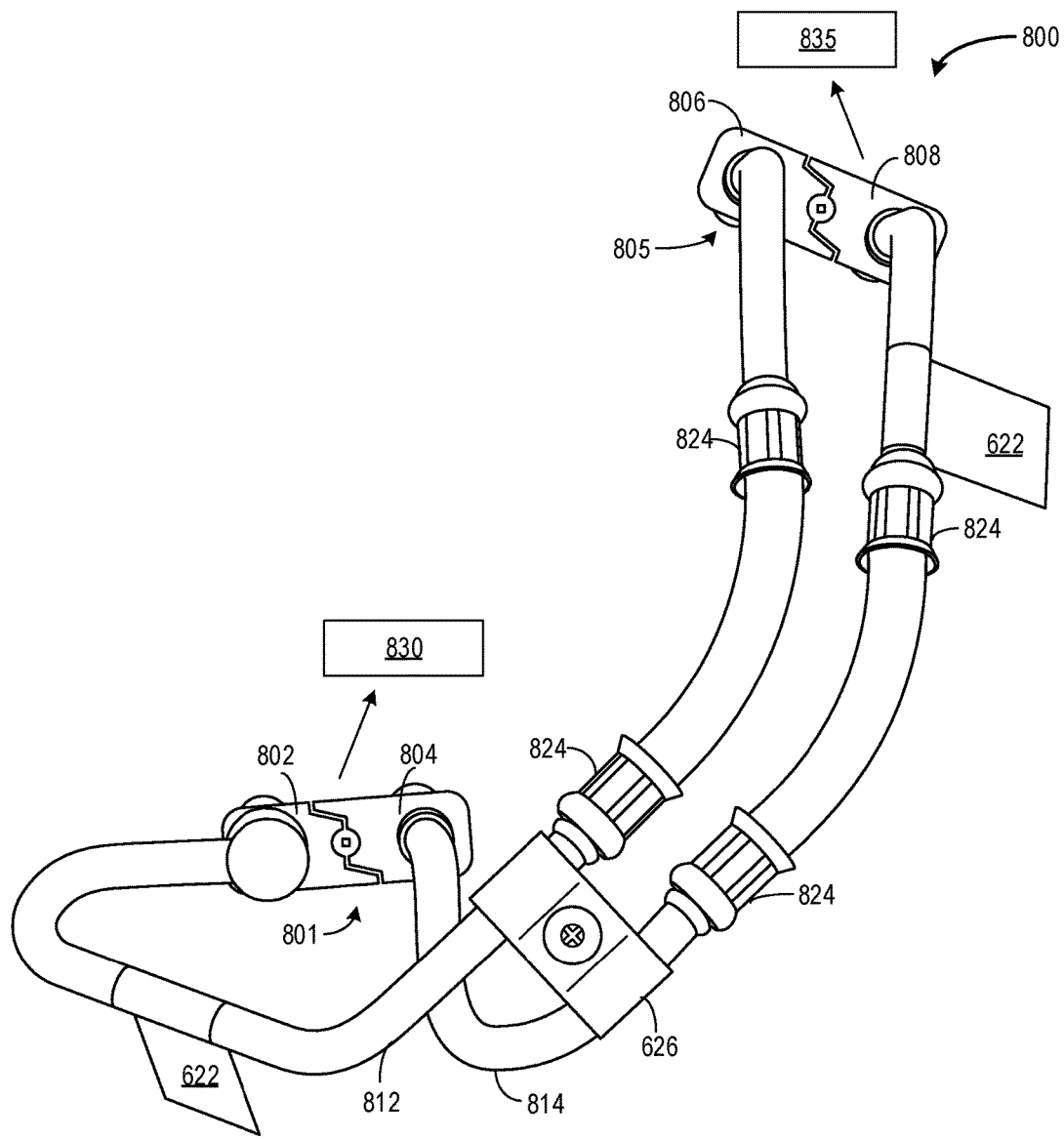
FIG. 8 is a schematic view showing two latch plate assemblies coupling a pair of pipes to two separate engine components.

The following description relates to systems and methods for a latch plate assembly for coupling two or more pipes to an engine component. FIG. 1 shows a sectional view of a latch plate assembly as seen in prior art. FIG. 2 shows the latch plate arrangement of FIG. 1 assembled incorrectly. FIGS. 3, 4, and 6 show schematics of latch plate assemblies coupling a pair of pipes to an engine component. A latch plate assembly may be placed on a housing of the engine component as shown in FIG. 7. A plurality of latch plate assemblies may be used, as shown in FIG. 8, to couple a pair of pipes to multiple distinct engine components. FIG. 5 shows an example method for assembling two pipes to an engine component utilizing the latch plate assembly of FIG. 3.

With reference to FIG. 1 (prior art) schematic 100 shows a housing assembly 2 for a motor vehicle comprising a housing 4, and first and second latch plates 6, 8. A first pipe 10 is coupled to the first latch plate 6 and a second pipe 12 is coupled to the second latch plate 8. The first and second latch plates 6, 8 are coupled to the housing by a fastener 14, such that the first and second pipes 10, 12 are in fluid communication with first and second housing ports 3, 5 respectively.

The housing assembly may be for a radiator of the motor vehicle, a heating, ventilation and air-conditioning system of the motor vehicle, a turbocharger, or for any other fluid circuit of the motor vehicle. The housing assembly may be provided within an engine assembly of the motor vehicle.

As depicted in FIG. 1, fastener bores 6c, 8c are formed in the first and second latch plates 6, 8. When the first and second latch plates 6, 8 are coupled to the housing 4, the first and second latch plates 6, 8 are arranged to overlap with one another, such that the fastener bores 6c, 8c are aligned. The first and second latch plates 6, 8 are coupled to the housing 4 by the fastener 14, which passes through the fastener bores 6c, 8c formed in both of the latch plates 6, 8.

The first and second pipes 10, 12 each comprise a connector 16, 18 provided at ends of the first and second pipes adjacent to the first and second latch plates 6, 8 respectively. The connectors 16, 18 extend from the latch plates and define respective openings 10a, 12a of the first and second pipes. As shown in FIG. 1, when the latch plates 6, 8 are coupled to the housing 4, the first and second connectors 16, 18 are partially received within the respective housing ports 3, 5.

The first and second connectors 16, 18 each comprise a seal component 20, 22, such as an O-ring seal, configured to create a seal between the connector and the housing port. The first and second housing ports 3, 5 each comprise a sealing surface 3a, 5a configured to engage with the seal component 20, 22 of the corresponding pipe connector 16, 18 in order to create the seal. The seal components 20, 22 are therefore positioned at an appropriate distance along the pipe connectors 16, 18, e.g. between the latch plates 6, 8 and the pipe openings 10a, 12a, such that, when the latch plates are coupled to the housing, the seal components 20, 22 engage with the respective sealing surfaces 3a, 5a of the housing ports 3, 5. The pipe connectors 16, 18 may be different lengths, in order to support the seal components 20, 22 at different distances from the respective latch plates 6, 8.

In the arrangement shown in FIG. 1, the housing assembly 2 is assembled correctly, such that a lower surface 6a of the first latch plate 6 is positioned against the housing 4, and a lower surface 8a of the second latch plate 8 is positioned against an upper surface 6b of the first latch plate. Hence, the second latch plate 8, e.g. the lower surface 8a of the second latch plate, is spaced apart from the housing 4. A shoulder 14a of the fastener 14 acts against an upper surface 8b of the second latch plate in order to clamp the first and second latch plates 6, 8 to the housing.

When the housing assembly 2 is correctly assembled, as depicted in FIG. 1, the first and second pipe connectors 16, 18 are received within the respective housing ports 3, 5 to desired depths. Furthermore, the seal components 20, 22 are positioned to engage with respective sealing surfaces 3a, 5a of the housing ports 3, 5.

With reference to FIG. 2, schematic 200 shows the housing assembly 2 depicted in FIG. 1 assembled incorrectly, such that the lower surface 8a of the second latch plate is positioned against the housing 4 and the lower surface 6a of the first latch plate is positioned against the upper surface 8b of the second latch plate. When the housing assembly 2 is assembled in this way, the shoulder 14a of the fastener 14 may clamp against the upper surface 6b of the first latch plate.

When the housing assembly 2 is incorrectly assembled, the first pipe connector 16 may not be received within the first housing port 3 to a desired depth. Furthermore, the seal components 20, 22 may not engage with the sealing surfaces 3a, 5a. Hence, when the housing assembly 2 is incorrectly assembled, adequate seals may not be formed between the first and second pipes 10, 12 and the first and second housing ports 3, 5, respectively.

With reference to FIGS. 3 (schematic 300) and 4 (schematic 400), a housing assembly 101 according to the present disclosure will now be described. The housing assembly 101 comprises a housing 110 and a latch plate assembly 120.

The latch plate assembly 120 comprises a first latch plate 122 and a separate second latch plate 124. The two latch plates, 122 and 124 may be mirror images of each other. A first pipe 126 is couplable to the first latch plate and a second pipe 128 is couplable to the second latch plate 124. For example, the first and second latch plates may each comprise a pipe bore configured to receive the first and second pipes 126, 128 respectively.

The latch plates 122, 124 may be substantially planar. In other words, the latch plates may have a flat lower surface 122a, 124a that rests on a flat surface of the housing. Additionally, the latch plates may have a flat upper surface 122b, 124b. The upper surface 122a, 124a of each latch plate may be parallel to the lower surface of the latch plate 122b, 124b.

The housing comprises first and second ports 112, 114. The housing 110 and the latch plate assembly 120 are configured such that when the housing assembly 101 is assembled, e.g. when the first and second latch plates are coupled to the housing, the first and second pipes 126, 128 are arranged in fluidic communication with the first and second housing ports 112, 114 respectively.

The first and second pipes 126, 128 comprise first and second pipe connectors 130, 132 provided at ends 126a, 128a of the corresponding pipes respectively and extending from the respective latch plates 122, 124. In the arrangement shown in FIGS. 3 and 4, the first and second pipe connectors 130, 132 are coupled to pipe bodies 126b, 128b of the first and second pipes 126, 128. However, in other arrangements, the first and second pipe connectors 130, 132 may be integrally formed with the pipe bodies. For example, the first and second pipe connectors 130, 132 may be formed by lengths of the first and second pipe bodies 126b, 128b located at the ends 126a, 128a of the first and second pipes respectively.

In the arrangement depicted, each of the pipes 124, 126 is coupled to the corresponding latch plate 122, 124 at the pipe connector 130, 132 provided on the pipe. However in other arrangements, one or both of the pipes 126, 128 may be coupled to the corresponding latch plate at the pipe body 126b, 128b, e.g. such that the pipe connectors 130, 132 are arranged to one side of each of the associated latch plates.

The latch plate assembly 120 is coupled to the housing 110 by a fastener 116, such that the first and second pipes 126, 128 are held in fluidic communication with the first and second housing ports 112, 114 respectively. As shown in FIG. 4, the pipe connectors 130, 132 are at least partially received within the housing ports 112, 114. In one example, upon coupling, an equal portion of each of the pipe connectors 130, 132 may be received within the housing ports 112, 114. Therefore, the pipe connectors 112, 114 may be coupled at an equal height relative to the engine component. Due to the equal height of the pipes 126, 128 relative to the engine component, modifications to geometry of the corresponding pipe connectors and/or the sealing component may not be needed. However, it is also envisaged that, in alternative arrangements, one or both of the pipe connectors 130,132 may be configured to receive portions of the corresponding housing port within the pipe connectors.

The first and second latch plates 122, 124 each comprise an interface portion 123, 125. The interface portions 123, 125 are configured to form an interface between the first and second latch plates 112, 114 when the latch plate assembly 120 is assembled.

As depicted in FIGS. 3 and 4, the first and second latch plates 122, 124 are configured such that the latch plates are arranged side by side at least at the location of the fastener 116, when the housing assembly 101 is assembled. In other words, the first and second latch plates 122, 124 may not overlap in a direction away from the housing. The first and second latch plates 122, 124 are configured to interlock with each other at the interface. The first and second latch plates 122, 124 interlock in a plane common to the planar latch plates.

The interface portions 123, 125 each comprise a plurality of teeth 123a, 125a. When the latch plate assembly 120 is assembled, the teeth 123a of the first latch plate interface within the teeth 125a of the second latch plate in an interdigitated manner.

As depicted in FIG. 3, the teeth 123a, 125a are trapezium shaped and comprise a straight edge, e.g. extending in a direction parallel to a side edge of the latch plate, a sloped edge arranged at an angle to, e.g. not parallel to, the straight edge, and a distal edge between the straight and sloped edges. However, in other arrangements, the teeth 123a, 125a may be straight, e.g. square or rectangular, saw tooth shaped, e.g. triangular, having a flat, pointed or rounded distal end. Additionally the teeth 123a, 125a may comprise one or more arcuate edges.

In the arrangement depicted, the latch plates comprise two teeth 123a, 125a. Gaps between the teeth correspond to the shapes of the teeth, e.g. such that the teeth of an interfacing latch plate can be received in the gap between the teeth. Additionally, gaps between the teeth and the side edges of the latch plate may correspond to the shapes of the teeth.

The first and second latch plates 122, 124 are configured to define a fastener bore 140 at the interface between the first and second latch plates 122, 124. In the arrangement depicted in FIG. 3, each of the first and second latch plates defines half, e.g. a semi-circular portion, of the fastener bore 140, e.g. of a perimeter of the fastener bore 140. However, in other arrangements, the first and second latch plates 122, 124 may define different perimeter portions of the fastener bore 140 to each other. As shown, the portions of the fastener bore 140 may be formed in two of the teeth 123a, 125a provided on the interface portions 123, 125 of the first and second latch plates 122, 124. The fastener bore 140 may be formed where the straight edges of the teeth 123a, 125a meet.

Referring to FIGS. 3 and 4, when the fastener 116 is received in the fastener bore 140, a shoulder 116a of the fastener abuts a fastener surface 142 that is partially formed by the first latch plate 122, e.g. the upper surface 122b of the first latch plate, and partially formed by the second latch plate 124, e.g. the upper surface 124b of the second latch plate. The fastener 116 may be threaded into a threaded bore provided in the housing in order to couple the first and second latch plates 122, 124 to the housing 110. The fastener shoulder acts against both the first and second latch plates 122, 124, e.g. at the fastener surface 142, to clamp the first and second latch plates against the housing 110.

The interlocking nature of the interface between the first and second latch plates 122, 124 may prevent the latch plates from separating after the first and second latch plates 122, 124 are coupled to the housing 110. For example, the interlocking nature of the interface may prevent the first and second latch plates 122, 124 being pivoted about the first and second pipes 126, 128 respectively, in order to disconnect the first and second latch plates 122, 124 from each other, and to disconnect one or both of the first and second latch plates 122, 124 from the housing 110.

As the latch plates 122, 124 may not overlap, the housing assembly 101 may not be assembled incorrectly in the same way as the housing assembly depicted in FIGS. 1 and 2. The design of the first and second latch plates 122, 124 depicted in FIGS. 3 and 4 therefore improves the ease of assembling the housing assembly and also ensures that good seals are reliably formed between the pipes 126, 128 and the housing ports 112, 114, as described below.

As shown in FIG. 4, the upper surface 122b of first latch plate is aligned with the upper surface 124b of the second latch plate. Additionally, the lower surface 122a of the first latch plate is aligned with the lower surface 124a of the second latch plate.

In one arrangement of the present disclosure, the first and second latch plates 122, 124 are common components. In other words, the size, shape and thickness of the first and second latch plates 122, 124 are the same. In other arrangements, the first and second latch plates 122, 124 may differ.

For example, the sizes of the pipe bores or configuration of other features provided on the latch plates 112, 124 to allow the respective pipes 126, 128 to be coupled to the latch plates may vary. Additionally or alternatively, the size, shape and/or thickness of the first and second latch plates 122, 125 may be different.

The pipe connectors 130, 132 each comprise a seal component 134, 136, such as an O-ring seal. As shown in FIGS. 3 and 4, the seal components 134, 136 are arranged about each of the pipe connectors 130, 132. However in other arrangements, the seal components may be provided within one or both of pipe connectors 130, 132, for example, in arrangements in which the pipe connectors receive portions of the first and/or second housing ports within the respective pipe connectors.

Each of the seal components is positioned along the respective pipe connector 130, 132 at a desired location. In other words, the seal components 134, 136 provided on the first and second pipe connectors are spaced apart from the associated latch plate 122, 124 and/or the first and second pipe ends 126a, 128a by respective predetermined distances. For example, the seal component 134 provided on the first pipe connector 130 is spaced apart from the first latch plate 122 by a first predetermined distance and the seal component 136 provided on the second pipe connector 132 is spaced apart from the second latch plate 124 by a second predetermined distance.

The first and second predetermined distances are selected such that when the latch plates are coupled to the housing 110, the seal components 134, 136 are aligned with respective sealing surfaces 113, 115 of the corresponding housing ports 112, 114 in which the connectors are received. The seal components 134, 136 are configured to engage the sealing surfaces 113, 115 in order to create seals between the first and second pipes 126, 128 and the respective housing ports 112, 114 when the latch plates 122, 124 are coupled to the housing 110.

As described above, the first and second latch plates 122, 124 may not overlap. Hence the first and second predetermined distances may be the same, e.g. in order for the seal components 134, 136 to be received at the same depth within the respective housing ports 112, 114. Furthermore, the lengths of the pipe connectors 130, 132 may be the same. In some arrangements, the pipe connectors 130, 132 may be common components or may be integrally formed on the first and second pipes 126, 128 in the same way, e.g. such that they have the same shape and size.

Alternatively, the first and second predetermined distances may be different. Additionally or alternatively, the lengths of the pipe connectors 130, 132 may be different.

FIG. 6 shows a perspective view 600 of a latch plate assembly 162 coupled to a turbocharger housing 602 housed in an engine. The turbocharger housing 602 may include a turbine coupled to an exhaust passage of the engine and a compressor coupled to an intake manifold of the engine.

A first pipe 126 and a second pipe 128 may be coupled to a body 605 of the turbocharger housing 602. The first pipe 126 and the second pipe 128 may be held at a constant mutual distance via a bracket 626. In one example, engine coolant may enter the turbocharger housing via the first pipe 126 and after circulating through the turbocharger components, the coolant may exit the housing 602 via the second pipe 128.

The end of the first pipe 126 which is coupled to the body 605 may include a first pipe connector 130 while the end of the second pipe 128 which is coupled to the body 605 may include a second pipe connector 132. The first pipe connector 130 may be welded to a first opening of a first latch plate 122 while the second pipe connector 132 may be welded to a second opening of a second latch plate 124. Each of the first pipe connector 130 and the second pipe connector 132 may be inserted into respective housing ports within the body 605 to fluidically couple each of the first pipe 126 and the second pipe 128 to the turbocharger assembly 602.

A first set of teeth 123a may be formed in a first side (also referred herein as first interface 123) of the first latch plate 122 and a second set of teeth 125a may be formed in a second side (also referred herein as second interface 125) of the second latch plate 124. Coupling of the first latch plate 122 and the second latch plate 124 to the body 605 of the turbocharger 602 may include the first side of the first latch plate 122 being in physical contact with the second side of the second latch plate 124, the first set of teeth 123a and the second set of teeth 125a interlinked forming a planar interface. Upon interlocking the first set of teeth 123a and the second set of teeth 125a, a bore (not shown) may be formed on the planer interface. A fastener 116 may be inserted into the bore to fasten the latch plate assembly 162 to the body 605 of the turbocharger 602. In this way, the two pipes 126 and 128 may be fastened to the turbocharger assembly 602 via the latch plate assembly 162.

FIG. 7 shows a schematic perspective view 700 of the latch plate assembly 162 (as shown in FIG. 6) positioned on a turbocharger housing 602. In view 700, the pipes (as shown in view 600 in FIG. 6) are not attached to the latch plate assembly 162.

A first latch plate 122 is shown with a first set of teeth 123a etched on a first side which is in physical contact with a second side of a second latch plate 124. A second set of teeth 125a may be etched on the second side of the second latch plate 124. The first set of teeth 123a define a first half 140a of a perimeter of a bore 140 and the second set of teeth 125a define a second half 140b of the perimeter of the bore 140, the first half of the perimeter and the second half of the perimeter forming the total bore perimeter upon coupling of the first latch plate 122 to the second latch plate 124. A fastener may be inserted through the bore 140 to couple the latch plate assembly 162 to the body 605 of the turbocharger assembly 602. The first latch plate 122 and the second latch plate 124 have be (mirror) symmetric.

The first latch plate includes a first opening 112 to allow coupling of a first pipe to the body 605 via the first latch plate 122. Similarly, the second latch plate includes a second opening 114 to allow coupling of a second pipe to the body 605 via the second latch plate 124. During coupling, a first pipe connector of the first pipe and a second pipe connector of the second pipe may be inserted into the first opening 112 and the second opening 114, respectively. The first opening may overlap with a first housing port in the body 605 of the turbocharger assembly 602 while the second opening may overlap with a second housing port in the body 605 of the turbocharger assembly 602, thereby allowing for the pipes (upon coupling) to be fluidically coupled to the body 605.

In this way, a first latch plate may have an end with a co-planer first teeth set, a second latch plate may have an end with a co-planer second teeth set to interlock with the first teeth set; and a bore may be formed at the interlock to receive a fastener to couple the first and second latch plates to a component, the first and second latch plates each coupled to a first and a second pipes.

FIG. 8 shows a schematic view 800 of two latch plate assemblies coupling a pair of pipes to two separate engine components. Each of a first pipe 812 and a second pipe 814 may be coupled to each of a first latch plate assembly 801 and a second latch plate assembly 805.

The first latch plate assembly 801 may include a first latch plate 802 and a second latch plate 804. The first latch plate 802 may include a first set of teeth etched in a first edge of the first latch plate 802 and a first half of a perimeter of a bore formed in the first set of teeth, and wherein the second latch plate 804 may include a second set of teeth etched in a second edge of the second latch plate and a second half of the perimeter of the bore formed in the second set of teeth, the first edge of the first latch plate physically in contact with the second edge of the second latch plate upon coupling of the first latch plate to the second latch plate. Coupling each of the first pipe 812 and the second pipe 814 to the first engine component 830 includes inserting a first connector of the first pipe into a first housing port in the engine component and inserting a first connector of the second pipe 814 into a second housing port in the engine component, each of the connectors held within the first housing port and the second housing port, respectively, via one or more O-rings. A fastener may be inserted via the bore formed on the first latch plate assembly 801 to hold in place the first latch plate assembly 801, the two pipes 812, 814, and the first engine component 830.

Similarly, the second latch plate assembly 805 may include a toothed third latch plate 806 interlinked to a toothed fourth plate 808 to form a planer coupling including a bore. Coupling each of the first pipe 812 and the second pipe 814 to the second engine component 830 includes inserting a second connector of the first pipe into a first housing port in the second engine component and inserting a second connector of the second pipe 814 into a second housing port in the engine component, each of the connectors held within the first housing port and the second housing port, respectively, via one or more O-rings. A fastener may be inserted via the bore formed on the second latch plate assembly 805 to hold in place the second latch plate assembly 805, the two pipes 812, 814, and the second engine component 835.

In this way, each of the first latch plate assembly 801 and the second latch plate assembly 805 fluidically couples the first engine component 830 to the second engine component 835 via the two pipes 812 and 814.

Turning now to FIG. 5, an example routine 500 for assembling a housing assembly wherein a pair of pipes are coupled to an engine component via a latch plate assembly. Example routine 500 may be used by the latch plate assembly (such as latch plate assembly 120 in FIG. 3) described in reference to FIGS. 3, 4, and 6 to couple each of a first pipe (such as first pipe 126 in FIG. 3) and a second pipe (such as first pipe 128 in FIG. 3) to a housing (such as housing 110 in FIG. 3) of the engine component.

At 502, the first pipe may be coupled to the first latch plate via welding. A first pipe connector may be coupled to the end of the first pipe in contact with the first latch plate. In a second step 504, the second pipe may be coupled to the second latch plate via welding. A second pipe connector may be coupled to the end of the second pipe in contact with the second latch plate.

At 506, the first and second latch plates are arranged such that a bore for receiving a fastener is defined at the interface between the first and second plates and the first and second latch plate do not overlap at the location of the fastener bore. Interface portions of the first and second latch plates may be arranged to interlock with one another in order to inhibit the first and second latch plates from being disconnected from one another and the housing once they have been coupled to the housing. During interlocking of the first latch plate to the second latch plate, a first set of teeth formed on one side of the first latch plate may come in physical contact with a second set of teeth formed on a side of the second latch plate and the two sets of teeth may be interlinked to form a planer interface.

Upon interlocking, the first and second pipes may be arranged such that they are in fluidic communication with respective housing ports formed a housing of an engine component. In one example, the engine component may be a turbocharger and the two pipes may be coolant lines carrying engine coolant to and from the turbocharger. At 508, the first pipe connector may be inserted into a first housing port formed in the body (housing) of the engine component. The first connector may be coupled to an inner surface of the first housing port via a first sealing component such as a first O-ring. Upon inserting and sealing the first connector into the body of the engine component, first pipe may be fluidically coupled to the first housing port.

At 510, the second pipe connector may be inserted into a second housing port formed in the body (housing) of the engine component. The second connector may be coupled to an inner surface of the second housing port via a second sealing component such as a second O-ring. Upon inserting and sealing the second connector into the body of the engine component, the second pipe may be fluidically coupled to the second housing port. Fluids may be supplied to (or routed from) the engine component via each of the first pipe and the second pipe.

At 508, the first and second latch plates, are coupled to a housing of an engine component using a fastener. The fastener may pass though the bore formed on the interface of the latch plate assembly, and threading on the fastener may be coupled to a threading provided in the bore included in the housing. The fastener may include a shoulder portion and a threaded lower portion, and upon coupling of first latch plate and the second latch plate to the engine component, the lower portion is inserted in the bore and the shoulder portion remains in physical contact with an upper surface of the planer interface. The threading on the fastener may engage with a threading on an inner wall of the bore thereby facilitating the coupling of the latch plate assembly to the engine component.

FIGS. 1-4 and 6-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by using a symmetric latch plate assembly, two pipes may be coupled to an engine component without any modifications to the geometry of the pipes. The design of the latch plates allow the plates to be assembled in a single configuration thereby reducing the possibility of erroneous assembly.

An example latch plate assembly for coupling pipes to a housing comprises: a first latch plate couplable to a first pipe, and a second latch plate couplable to a second pipe, the first and second latch plates being couplable to the housing, wherein the first and second latch plates are together configured to define a bore at an interface between the first and second latch plates, wherein the bore receives a fastener to couple the first and second latch plates to the housing and wherein the bore has a perimeter, the first latch plate defining a first portion of the bore perimeter and the second latch plate defining a second portion of the bore perimeter, the first portion and the second portion together defining the bore perimeter, wherein the first and second latch plates each comprise a plurality of teeth, wherein the teeth of one of the latch plates are configured to interface in an interdigitated manner with the teeth of the other of the latch plates. In any preceding example, additionally or optionally, each of the first and second latch plates defines half of the fastener bore. In any or all of the preceding examples, additionally or optionally, the first and second latch plates are together configured to define a fastener surface against which a shoulder of the fastener abuts in order to couple the first and second latch plates to the housing. In any or all of the preceding examples, additionally or optionally, the first pipe is arranged in fluidic communication with a first port in the housing when the first pipe is coupled to the first latch plate and the second pipe is arranged in fluidic communication with a second port in the housing when the second pipe is coupled to the second latch plate. In any or all of the preceding examples, additionally or optionally, the first pipe comprises a first pipe connector arranged between the first latch plate and an end of the first pipe when the first pipe is coupled to the first latch plate, and wherein the second pipe comprises a second pipe connector arranged between the second latch plate and an end of the second pipe when the second pipe is coupled to the second latch plate. In any or all of the preceding examples, additionally or optionally, the first and second pipe connectors each comprise seal components configured to create a seal between the first port and the second port in the housing and the first and second pipe connectors respectively, the seal components spaced apart from the latch plates by respective predetermined distances when the first pipe and the second pipe are coupled to the latch plates.

Another example latch plate assembly comprises: a first latch plate having an end with a co-planer first teeth set, a second latch plate having an end with a co-planer second teeth set to interlock with the first teeth set, and a bore formed at the interlock to receive a fastener to couple the first and second latch plates to a component, the first and second latch plates each coupled to a first and a second pipes. In any preceding example, additionally or optionally, the set of coplanar teeth includes a first set of teeth formed in a first side of the first latch plate and a second set of teeth formed in a second side of the second latch plate. In any or all of the preceding examples, additionally or optionally, the first set of teeth define a first half of a perimeter of the bore and the second set of teeth define a second half of the perimeter of the bore, the first half of the perimeter and the second half of the perimeter forming the total bore perimeter upon coupling of the first latch plate to the second latch plate. In any or all of the preceding examples, additionally or optionally, the coupling of the first latch plate and the second latch plate to the engine component includes the first side of the first latch plate being in physical contact with the second side of the second latch plate, first set of teeth and the second set of teeth interlinked forming a planar interface. In any or all of the preceding examples, additionally or optionally, the fastener includes a shoulder portion and a lower portion, and upon coupling of first latch plate and the second latch plate to the engine component, the lower portion is inserted in the bore and the shoulder portion remains in physical contact with an upper surface of the planer interface. In any or all of the preceding examples, additionally or optionally, the first pipe is welded to the first latch plate and the second pipe is welded to the second latch plate, and upon coupling of the first latch plate and the second latch plate to the engine component, the first pipe fluidically coupled to a first housing port formed in a body of the engine component, and the second pipe fluidically coupled to a second housing port formed in the body of the engine component. In any or all of the preceding examples, additionally or optionally, the first pipe includes a first pipe connector coupled to an end of the first pipe in contact with the first latch plate and the second pipe includes a second pipe connector coupled to an end of the second pipe in contact with the second latch plate. In any or all of the preceding examples, additionally or optionally, upon coupling of the first latch plate and the second latch plate to the engine component, the first pipe connector is inserted into the first housing port, and the second connector is inserted into the second housing port, and wherein the first connector is coupled to an inner surface of the first housing port via a first sealing component and the second connector is coupled to an inner surface of the second housing port via a second sealing component. In any or all of the preceding examples, additionally or optionally, each of the first sealing component and the second sealing component is an O-ring. In any or all of the preceding examples, additionally or optionally, the engine component is a turbine of a turbocharger, the first pipe being a first coolant line carrying hot coolant from an engine to the turbine and the second pipe being a second coolant line carrying cooled from the turbine to a radiator.

In yet another example, a system comprises: a first latch plate assembly including a first latch plate and a second latch plate forming a planer interface for coupling a first pipe and a second pipe to a first engine component, the planer interface comprising an interconnection of first and second co-planer teeth each formed on a respective end of the first and second latch plates, and a bore positioned through the interconnection of the first and second co-planer teeth for receiving a fastener coupling the first latch plate assembly to the first engine component. In any preceding example, additionally or optionally, the first latch plate includes a first set of teeth etched in a first edge of the first latch plate and a first half of a perimeter of the bore formed in the first set of teeth, and wherein the second latch plate includes a second set of teeth etched in a second edge of the second latch plate and a second half of a perimeter of the bore formed in the second set of teeth, the first edge of the first latch plate physically in contact with the second edge of the second latch plate upon coupling of the first latch plate to the second latch plate. In any or all of the preceding examples, additionally or optionally, coupling each of the first pipe and the second pipe to the first engine component includes inserting a first connector of the first pipe into a first housing port in the engine component and inserting a second connector of the second pipe into a second housing port in the engine component, each of the first connector and the second connector held within the first housing port and the second housing port, respectively, via one or more O-rings. In any or all of the preceding examples, the system further comprises, additionally or optionally, each of the first pipe and the second pipe coupled to a second latch plate assembly, the second latch plate assembly fluidically coupling the first engine component to a second engine component via each of the first pipe, the second pipe, and the first latch plate assembly. In any or all of the preceding examples, additionally or optionally, the first engine component is a radiator and the second engine component is a heater core, and wherein each of the first pipe and the second pipe are coolant lines.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A latch plate assembly for coupling pipes to a housing, the latch plate assembly comprising:
a first latch plate couplable to a first pipe; and
a second latch plate couplable to a second pipe, the first and second latch plates being couplable to the housing, wherein the first and second latch plates are together configured to define a bore at an interface between the first and second latch plates, wherein the bore receives a fastener to couple the first and second latch plates to the housing and wherein the bore has a perimeter, the first latch plate defining a first portion of the bore perimeter and the second latch plate defining a second portion of the bore perimeter, the first portion and the second portion together defining the bore perimeter,
wherein the first and second latch plates each comprise a plurality of teeth, wherein the plurality of teeth of one of the first and second latch plates is configured to interface in an interdigitated manner by being received in gaps between the plurality of teeth of the other of the first and second latch plates.

2. The latch plate assembly of claim 1, wherein each of the first and second latch plates defines half of the fastener bore, and wherein the first and second latch plates do not overlap.

3. The latch plate assembly of claim 1, wherein the first and second latch plates are together configured to define a fastener surface against which a shoulder of the fastener abuts in order to couple the first and second latch plates to the housing.

4. The latch plate assembly of claim 1, wherein the first pipe is arranged in fluidic communication with a first port in the housing when the first pipe is coupled to the first latch plate and the second pipe is arranged in fluidic communication with a second port in the housing when the second pipe is coupled to the second latch plate.

5. The latch plate assembly of claim 1, wherein the first pipe comprises a first pipe connector arranged between the first latch plate and an end of the first pipe when the first pipe is coupled to the first latch plate, and wherein the second pipe comprises a second pipe connector arranged between the second latch plate and an end of the second pipe when the second pipe is coupled to the second latch plate.

6. The latch plate assembly of claim 5, wherein the first and second pipe connectors each comprise seal components configured to create a seal between the first port and the second port in the housing and the first and second pipe connectors, respectively, the seal components spaced apart from the first and second latch plates by respective predetermined distances when the first pipe and the second pipe are coupled to the first and second latch plates.

7. An apparatus, comprising:
a first latch plate having an end with a co-planer first teeth set comprising at least two teeth;
a second latch plate having an end with a co-planer second teeth set comprising at least two teeth to interlock between gaps of adjacent teeth of the first teeth set; and
a bore formed at the interlock to receive a fastener to couple the first and second latch plates to a component, the first and second latch plates each coupled to a first pipe and a second pipe.

8. The apparatus of claim 7, wherein the first teeth set defines a first half of a perimeter of the bore and the second teeth set defines a second half of the perimeter of the bore, the first half of the perimeter and the second half of the perimeter forming the total bore perimeter upon coupling of the first latch plate to the second latch plate.

9. The apparatus of claim 8, wherein the coupling of the first latch plate and the second latch plate to the component includes a first side of the first latch plate being in physical contact with a second side of the second latch plate, the first teeth set and the second teeth set interlinked to form a planar interface, wherein the planar interface is in a plane aligned with a longitudinal axis of the bore.

10. The apparatus of claim 9, wherein the fastener includes a shoulder portion and a lower portion, and, upon coupling of the first latch plate and the second latch plate to the component, the lower portion is inserted in the bore and the shoulder portion remains in physical contact with an upper surface of the planer interface.

11. The apparatus of claim 10, wherein the first pipe is welded to the first latch plate and the second pipe is welded to the second latch plate, and, upon coupling of the first latch plate and the second latch plate to the component, the first pipe fluidically couples to a first housing port formed in a body of the component and the second pipe fluidically couples to a second housing port formed in the body of the component.

12. The apparatus of claim 7, wherein the first pipe includes a first pipe connector coupled to an end of the first pipe in contact with the first latch plate and the second pipe includes a second pipe connector coupled to an end of the second pipe in contact with the second latch plate.

13. The apparatus of claim 12, wherein, upon coupling of the first latch plate and the second latch plate to the component, the first pipe connector is inserted into a first housing port and the second pipe connector is inserted into a second housing port, and wherein the first pipe connector is coupled to an inner surface of the first housing port via a first sealing component and the second pipe connector is coupled to an inner surface of the second housing port via a second sealing component.

14. The apparatus of claim 13, wherein each of the first sealing component and the second sealing component is an O-ring.

15. The apparatus of claim 7, wherein the component is a turbine of a turbocharger, the first pipe being a first coolant line carrying hot coolant from an engine to the turbine and the second pipe being a second coolant line carrying cooled coolant from the turbine to a radiator.

16. A system, comprising:
a first latch plate assembly including a first latch plate and a second latch plate forming a planer interface for coupling a first pipe and a second pipe to a first engine component, the planer interface comprising an interconnection of first and second co-planer teeth each formed on a respective end of the first and second latch plates, and a bore positioned through the interconnection of the first and second co-planer teeth for receiving a fastener coupling the first latch plate assembly to the first engine component, wherein the first latch plate includes a first set of teeth etched in a first edge of the first latch plate and a first half of a perimeter of the bore formed in the first set of teeth, and wherein the second latch plate includes a second set of teeth etched in a second edge of the second latch plate and a second half of the perimeter of the bore formed in the second set of teeth, the first edge of the first latch plate physically in contact with the second edge of the second latch plate upon coupling of the first latch plate to the second latch plate.

17. The system of claim 16, wherein coupling each of the first pipe and the second pipe to the first engine component includes inserting a first connector of the first pipe into a first housing port in the engine component and inserting a second connector of the second pipe into a second housing port in the engine component, each of the first connector and the second connector held within the first housing port and the second housing port, respectively, via one or more O-rings.

18. The system of claim 16, further comprising each of the first pipe and the second pipe coupling to a second latch plate assembly, the second latch plate assembly fluidically coupling the first engine component to a second component via each of the first pipe, the second pipe, and the first latch plate assembly.

19. The system of claim 18, wherein the first component is a radiator and the second engine component is a heater core, and wherein each of the first pipe and the second pipe is a coolant line.

* * * * *